US006950395B1

(12) United States Patent
Bashandy et al.

(10) Patent No.: US 6,950,395 B1
(45) Date of Patent: Sep. 27, 2005

(54) METHOD AND APPARATUS FOR A TOKEN BUCKET METERING OR POLICING SYSTEM WITH A DELAYED FILLING SCHEME

(75) Inventors: Ahmed R. Bashandy, Santa Clara, CA (US); Faisal Mushtaq, San Jose, CA (US); Jayaraman R. Iyer, Sunnyvale, CA (US); Manas Barooah, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 930 days.

(21) Appl. No.: 09/752,409

(22) Filed: Dec. 31, 2000

(51) Int. Cl.$^7$ .............................................. H04L 12/56
(52) U.S. Cl. ................... 370/230.1; 370/231; 370/235; 370/412; 370/428
(58) Field of Search ............................ 370/229, 230.1, 370/235, 253, 389, 412, 413, 415, 417, 419, 370/42.8, 230, 428, 429

(56) References Cited

U.S. PATENT DOCUMENTS

| | | | | |
|---|---|---|---|---|
| 5,978,356 | A * | 11/1999 | Elwalid et al. | 370/230 |
| 6,247,061 | B1 * | 6/2001 | Douceur et al. | 709/240 |
| 6,349,088 | B1 * | 2/2002 | Ginzboorg et al. | 370/230 |
| 6,359,861 | B1 * | 3/2002 | Sui et al. | 370/230 |
| 6,381,214 | B1 * | 4/2002 | Prasad | 370/230.1 |
| 6,522,628 | B1 * | 2/2003 | Patel et al. | 370/230.1 |
| 6,532,213 | B1 * | 3/2003 | Chiussi et al. | 370/230.1 |
| 6,567,379 | B1 * | 5/2003 | Walker et al. | 370/235.1 |
| 6,646,986 | B1 * | 11/2003 | Beshai | 370/230.1 |
| 6,754,182 | B1 * | 6/2004 | Aznar et al. | 370/252 |
| 6,785,232 | B1 * | 8/2004 | Kotser et al. | 370/230.1 |

OTHER PUBLICATIONS

C. Partridge, "A Proposed Flow Specification," RFC 1363, Sep. 1992, 20 pages.
Craig Partridge, Gigabit Networking, Addison Wesley Longman, Inc. 1994, pp. 253-263.

(Continued)

Primary Examiner—Hassan Kizou
Assistant Examiner—Ahmed Elallam
(74) Attorney, Agent, or Firm—The Law Office of Kirk D. Williams

(57) ABSTRACT

Methods and apparatus are disclosed for a token bucket metering or policing system with a delayed filing scheme which may be used, inter alia, in a computer or communications system, such as a packet switching system, router, or other device. The token bucket scheme updates the number of tokens in a particular bucket in response to an expiration of a timer or a receipt of a packet corresponding to a packet stream being metered or policed based on the particular bucket. One implementation determines whether a difference between a current time value with a last bucket update time value equals or exceeds a predetermined time interval. If the difference between the current time value with the last bucket update time value equals or exceeds the predetermined time interval, then a predetermined number of tokens is added to a bucket, and the last bucket update time value is incremented by approximately the predetermined time interval. In one implementation, the predetermined number of tokens corresponds to the number of tokens required to send a maximum sized packet and the predetermined time interval corresponds to the time required to accumulate the number of tokens required to send a maximum sized packet at the corresponding token generation rate. In this manner, a simple addition operation may be used to update the number of tokens in a token bucket to ensure that a maximum sized packet may be sent. Also, by updating the last bucket update time value by approximately the predetermined time interval, and not merely setting it to the current time, tokens which should be added to the token bucket are not lost, but rather added at a later time.

42 Claims, 14 Drawing Sheets

OTHER PUBLICATIONS

M. Shreedhar and George Varghese, "Efficient Fair Queuing Using Deficit Round-Robin," Proc. SIGCOMM' '95 Cambridge, MA, ACM, 1995, pp. 231-242.

M. Shreedhar and George Varghese, "Efficient Fair Queuing Using Deficit Round-Robin," IEEE/ ACM Transactions on Networking, vol. 4, No. 3 Jun. 1996, pp. 375-385.

Sugih Jamin et al., "A Measurement-Based Admission Control Algorithm for Integrated Service Packet Networks," IEEE/ACM Transactions on Networking, vol. 5, No. 1, Feb. 1997, pp. 56-70.

Grenville Armitage, Quality of Service in IP Networks: Foundations for a Multi-Service Internet, Macmillan Technical Publishing, Apr. 2000, pp. 35-104.

George Coulouris et al., Distributed Systems: Concepts and Design, Third Edition, Addison-Wesley, 2001, pp. 607-633.

S. Keshav, An Engineering Approach To Computer Networking: ATM Networks, The Internet, and the Telephone Network, Addison Wesley Longman, Inc. 1997, Chapter 9, pp. 209-263.

* cited by examiner

| STREAM (S) | TOKENS (T) | LAST TIME (LT) | BUCKET SIZE (SIZE) | RATE (R) | FILL TIME (FT) | MAX SIZED PACKET TIME (MSPTIME) | MAX SIZED PACKET TOKENS (MSPTOKENS) |
|---|---|---|---|---|---|---|---|
| 0 | | | | | | | |
| 1 | | | | | | | |
| 2 | | | | | | | |
| ... | ... | ... | ... | ... | ... | ... | ... |

FIGURE 4

METHOD AND APPARATUS FOR A TOKEN BUCKET METERING OR POLICING SYSTEM WITH A DELAYED FILLING SCHEME

FIELD OF THE INVENTION

This invention relates to a token bucket metering scheme for communications systems, routers, computers and communications devices; and more particularly, the invention relates to a token bucket metering or policing system with a delayed filing scheme.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

As used herein, the term "packet" refers to packets of all types, including, but not limited to, fixed length cells and variable length packets. Moreover, these packets may contain one or more types of information, including, but not limited to, voice, data, video, and audio information. Furthermore, the term "system" is used generically herein to describe any number of components, packet switch elements, packet switches, networks, computer and/or communication devices or mechanisms, or combinations thereof.

Consumers and designers of these systems typically desire high reliability and increased performance at a reasonable price. Also, certain users and applications of communications services demand a guaranteed quality of service. To help in this regard, communications systems may meter or police the amount of traffic allowed into a communications component or across a link. For example, a line card might assign and enforce an average traffic rate while accommodating a limited burstiness in the traffic.

A common approach to implement such a metering scheme is through a classic token bucket meter. Tokens are added to a bucket at some fixed rate of X (tokens per second) and are removed from the bucket whenever a packet arrives. A bucket also has a finite depth, as it never contains more than Y tokens. A token might represent the allowance of an entire packet, or might represent some fraction or multiple of a packet (e.g., one byte).

When a packet arrives and the requisite number of tokens are available (e.g., at least one token when a token represents one packet, at least m tokens for an m byte packet when a token represents a byte of information, etc.), the corresponding number of tokens are removed from the bucket and the packet is considered to be conforming (i.e., in profile). If the requisite number of tokens are not in the bucket when the packet arrives, the packet is declared to be non-conforming (i.e., out of profile). The token replenishment rate X represents the long-term average rate limit if packets are to remain conforming. However, packets may arrive in short bursts and still be considered in profile. For example, up to Y tokens may be available in the bucket, and therefore up to Y packets or Y bytes may arrive back to back in time and still get through. Judicious selection of X and Y allows a profile to enforce a desired long-term average packet rate while being tolerant of short bursts of packets arriving faster than X packets or bytes per second, or some variant thereof.

In a typical token bucket implementation, tokens are added to the bucket at the rate X. The step of adding tokens to the bucket is done in response to the arrival of a packet or an expiration of a timer, with the number of tokens added being a function of the current time, the last time tokens were added, and the rate X. In one known implementation, the number of tokens added is calculated by multiplying the rate X by the difference in the time (e.g., current time minus last time, or the interval of the timer). In another known implementation, the number of tokens added is calculated by a division operation of the time interval by the rate, typically to determine a number of elapsed fixed time periods. However, requiring the use of a multiply or divide operation to determine the number of tokens to add can be problematic especially when the processor or component determining the number of tokens to add does not have a built-in multiply or divide operation.

One known approach to avoid the use of a multiply operation uses a shifting operation (i.e., a multiply by two operation). However, this approach suffers from limitations on the rate or update interval, and may result in variances in the number of tokens added when compared to the desired rate caused by such things as truncating and rounding errors. Another known approach uses timers for incrementing the token buckets at fixed time intervals with the number of tokens added being pre-computed token products of the token generation rates and the fixed time intervals; however, managing such timers and incrementing rates across many policing entities in a system is complex and not easily scalable to a very large number of connections and rates.

Needed are new methods and apparatus for implementing a token bucket scheme, especially ones that do not rely on a real-time multiply operation to determine the number of tokens to add to a bucket.

SUMMARY OF THE INVENTION

Systems and methods are disclosed for use in a token bucket metering or policing scheme using a delayed bucket filing scheme. One embodiment determines whether a difference between a current time value with a last bucket update time value equals or exceeds a predetermined time interval. If the difference between the current time value with the last bucket update time value equals or exceeds the predetermined time interval, then a predetermined number of tokens is added to a bucket, and the current time value is incremented by approximately the predetermined time interval.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIG. 4 is a block diagram of a data structure maintained in one embodiment;

DETAILED DESCRIPTION

Figure 1A:
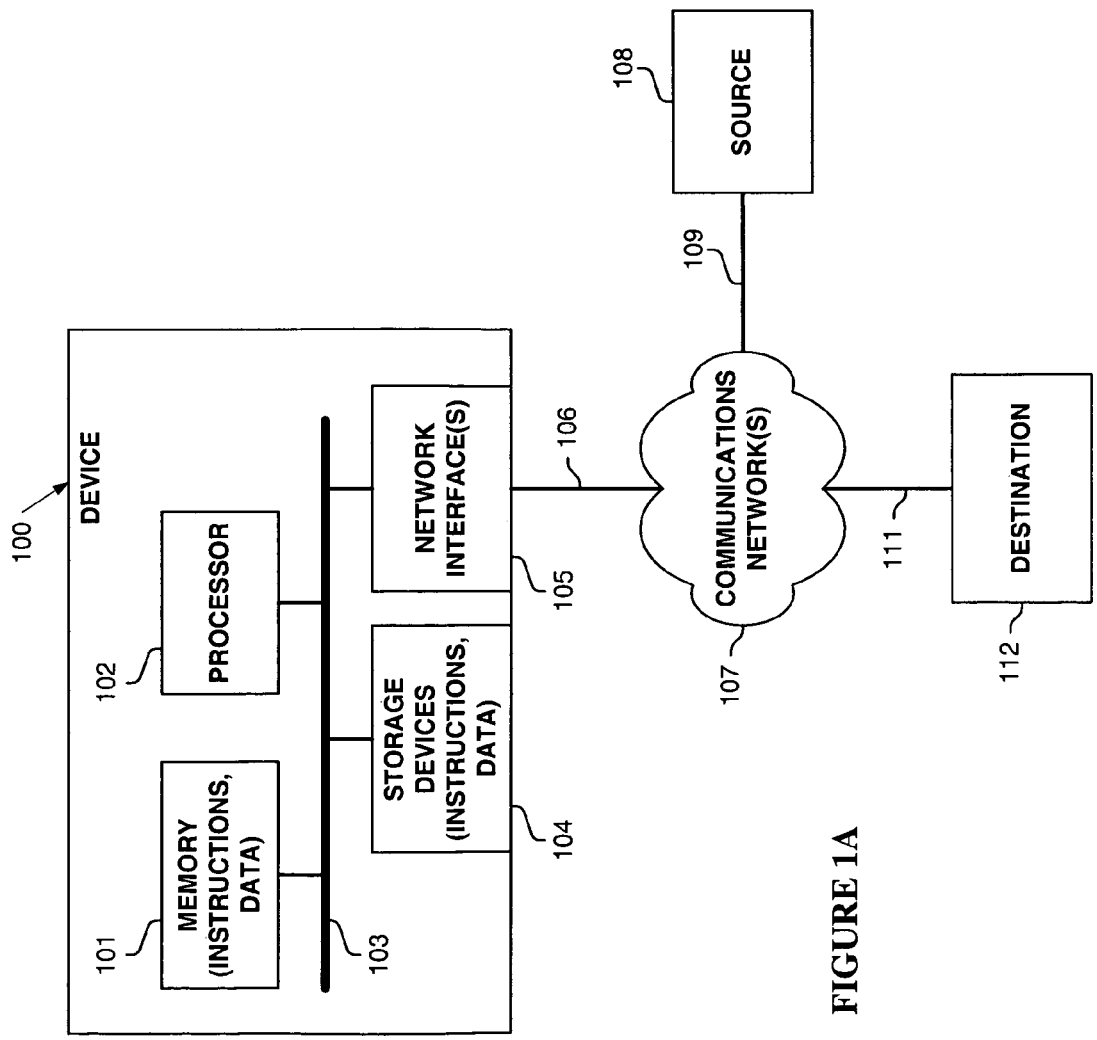
FIGS. 1A–D are block diagrams of exemplary embodiments including communications and computer systems.

Methods and apparatus are disclosed for a token bucket metering or policing system with a delayed filing scheme which may be used, inter alia, in a computer or communications system, such as a packet switching system, router, or other device. Such methods and apparatus are not limited to a single computer or communications system. Rather, the architecture and functionality taught herein are extensible to an unlimited number of computer and communications systems, devices and embodiments in keeping with the scope and spirit of the invention. Embodiments described herein include various elements and limitations, with no one element or limitation contemplated as being a critical element or limitation. Each of the claims individually recite an aspect of the invention in its entirety. Moreover, some embodiments described may include, but are not limited to, inter alia, systems, integrated circuit chips, embedded processors, ASICs, methods, and computer-readable medium containing instructions. The embodiments described hereinafter embody various aspects and configurations within the scope and spirit of the invention.

Methods and apparatus are disclosed for a token bucket metering or policing system with a delayed filing scheme which may be used, inter alia, in a computer or communications system, such as a packet switching system, router, or other device. The token bucket scheme updates the number of tokens in a particular bucket in response to an expiration of a timer or a receipt of a packet corresponding to a packet stream being metered or policed based on the particular bucket. One embodiment determines whether a difference between a current time value with a last bucket update time value equals or exceeds a predetermined time interval. If the difference between the current time value with the last bucket update time value equals or exceeds the predetermined time interval, then a predetermined number of tokens is added to a bucket, and the last bucket update time value is incremented by approximately the predetermined time interval. In one embodiment, the predetermined number of tokens corresponds to the number of tokens required to send a maximum sized packet and the predetermined time interval corresponds to the time required to accumulate the number of tokens required to send a maximum sized packet at the corresponding token generation rate. In this manner, a simple addition operation may be used to update the number of tokens in a token bucket to ensure that a maximum sized packet may be sent. Also, by updating the last bucket update time value by approximately the predetermined time interval (and not merely setting it to the current time), tokens which should be added to the token bucket are not lost, but rather added at a later time.

FIGS. 1A–3C and their discussion herein are intended to provide a description of various exemplary embodiments using a token bucket metering or policing system with a delayed filing scheme. An embodiment may use a token bucket metering or policing system with a delayed filling scheme in one or more locations, and does not necessarily implement such a scheme in all possible locations, including all the possible locations described herein in relation to the figures.

FIG. 1A illustrates a block diagram of one embodiment of a device 100 which may use a token bucket metering or policing system according to the invention. Device 100 could be a router, computer system, other communications device, or a component thereof. As shown, device 100 includes processor and/or control logic 102 (hereinafter "processor"), memory 101, storage devices 104, network interface(s) 105, and one or more internal communications mechanisms 103 (shown as a bus for illustrative purposes). In one embodiment, processor 102 controls the operations of device 100 according to the invention. Memory 101 is one type of computer-readable medium, and typically comprises random access memory (RAM), read only memory (ROM), integrated circuits, and/or other memory components. Memory 101 typically stores computer-executable instructions to be executed by processor 102 and/or data which is manipulated by processor 102 for implementing functionality in accordance with the invention. Storage devices 104 are another type of computer-readable medium, and typically comprise disk drives, diskettes, networked services, tape drives, and other storage devices. Storage devices 104 typically store computer-executable instructions to be executed by processor 102 and/or data which is manipulated by processor 102 for implementing functionality in accordance with the invention.

In one embodiment, device 100 operates as a router, bridge, switch or other communications device attached to a communications network 107. Packets sent from source 108 over link 109 to communications network 107 are relayed over one or more links 106 to device 100. Device 100 receives the packets and meters or polices the sending or consumption of packets using a token bucket scheme according to the invention. In one embodiment, device 100 consumes the stream of packets. In one embodiment, device 100 sends the stream of packets out one or more links 106 to destination 112, which receives these packets from communications network 107 over link 111.

In one embodiment, device 100 operates as a computer or communications system and meters or polices the sending or consumption of packets using a token bucket scheme according to the invention. In one embodiment, device 100 consumes a stream of packets. In one embodiment, device 100 sends a stream of packets out one or more links 106.

As used herein, computer-readable medium is not limited to memory and storage devices; rather computer-readable medium is an extensible term including other storage and signaling mechanisms including interfaces and devices such as network interface cards and buffers therein, as well as any communications devices and signals received and transmitted, and other current and evolving technologies that a computerized system can interpret, receive, and/or transmit.

Figure 1B:
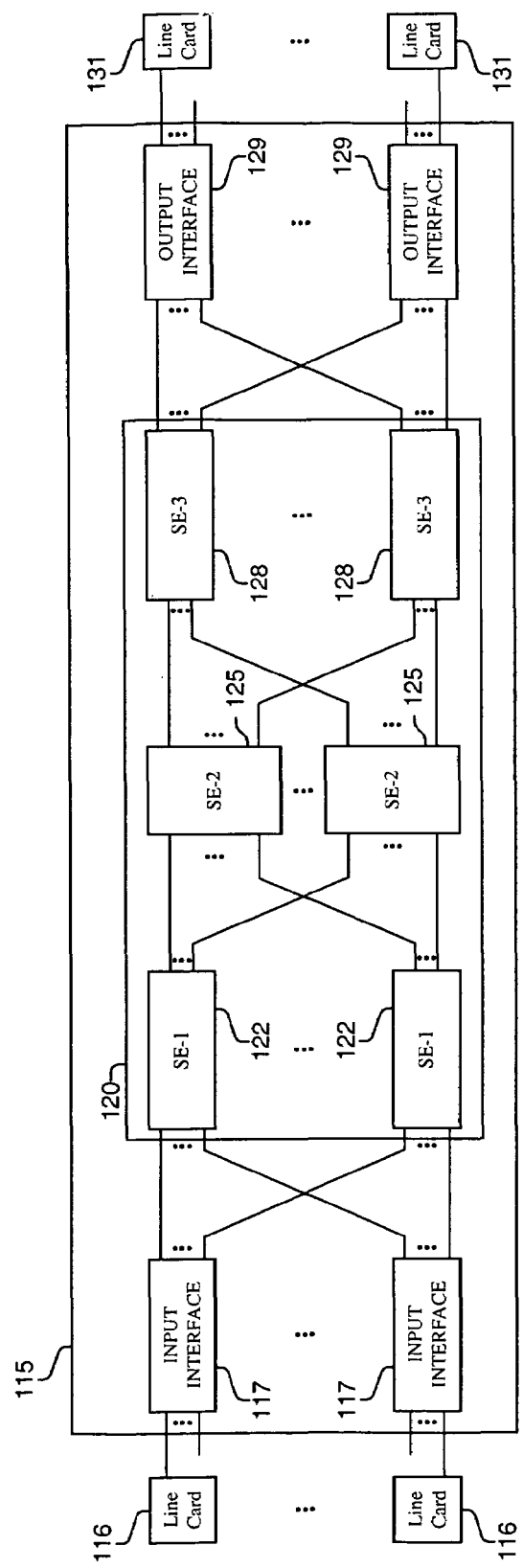
Figure 1C:
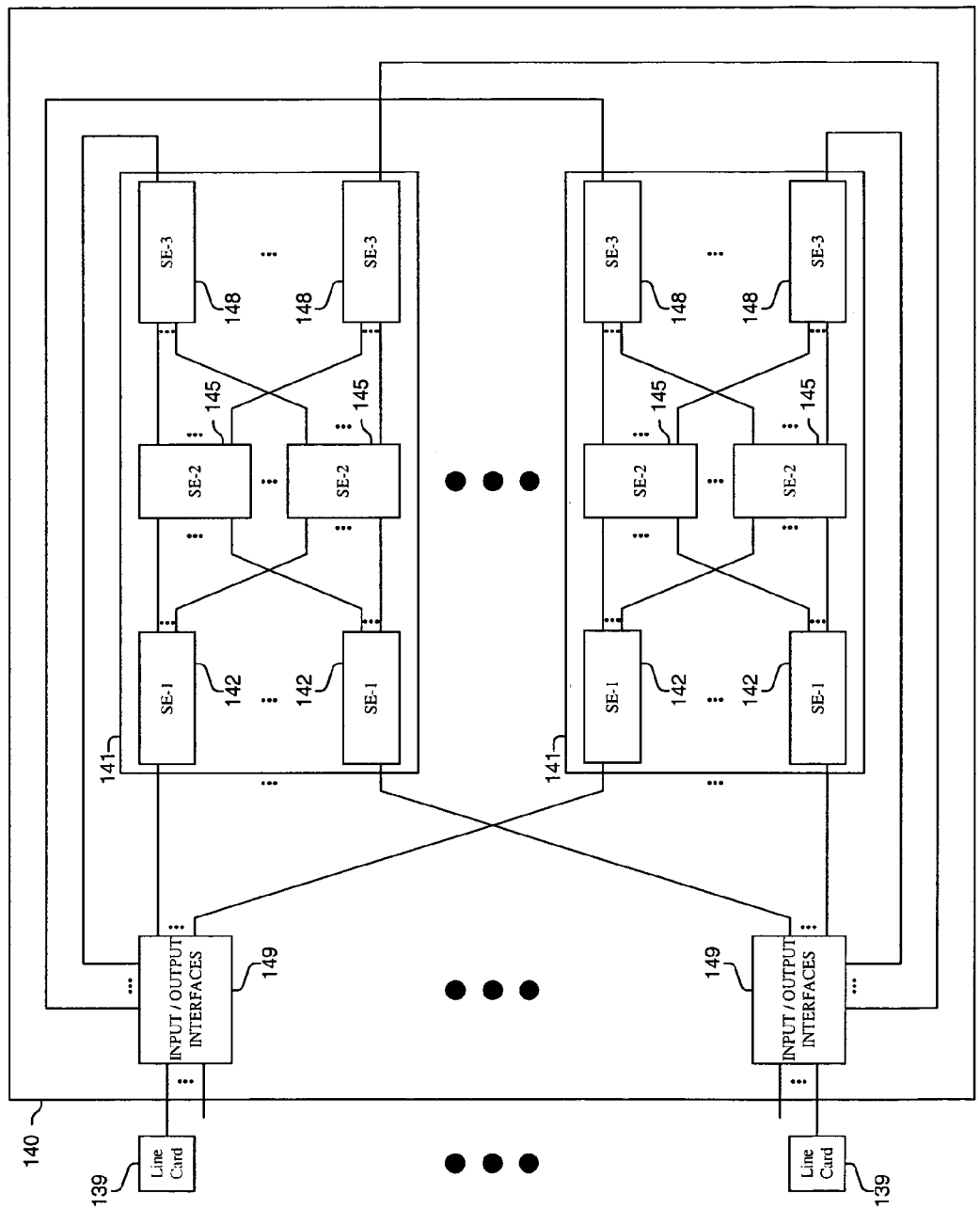
Figure 1D:
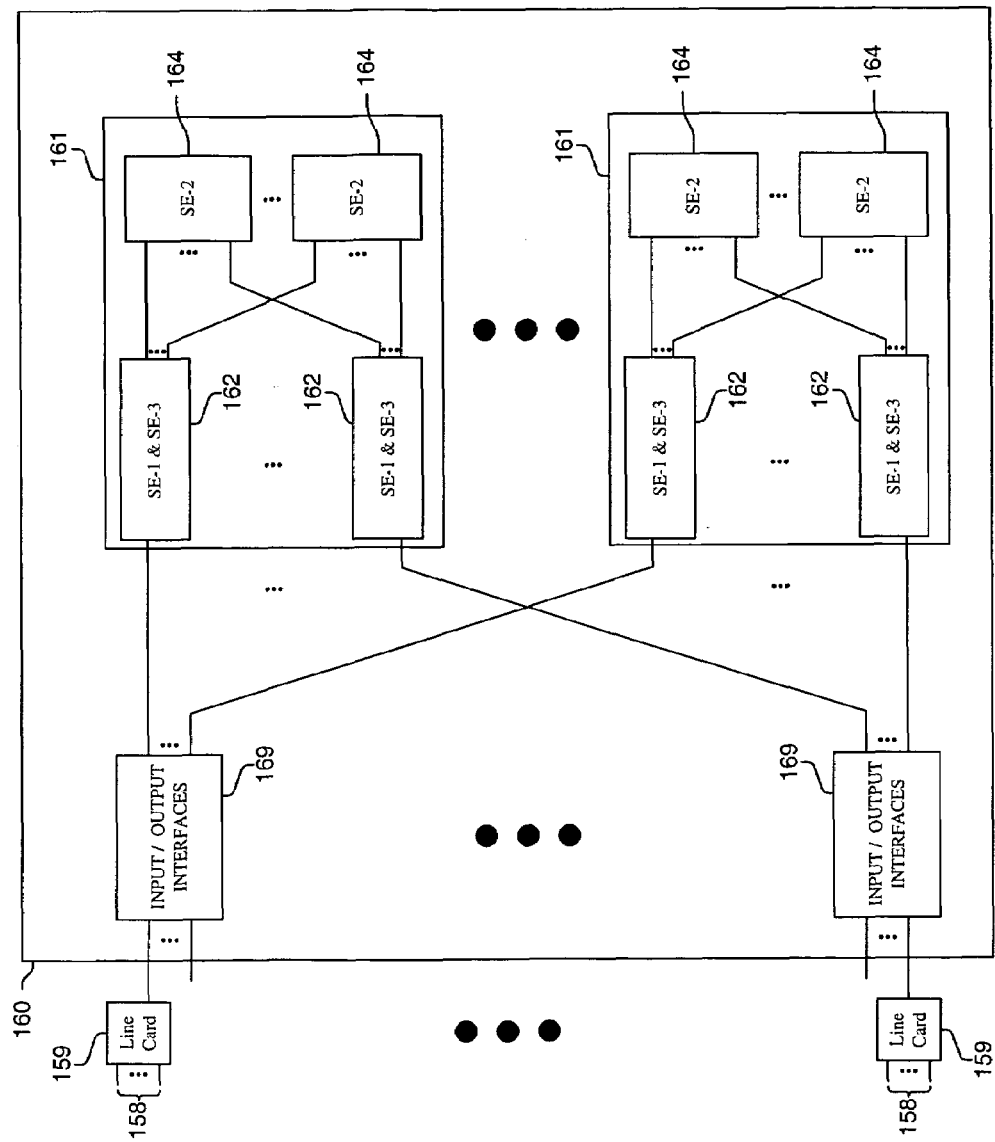

FIGS. 1B–D illustrate the basic topology of different exemplary packet switching systems using a token bucket metering or policing system with a delayed filing scheme.

FIG. 1B illustrates an exemplary packet switch 115 having multiple inputs and outputs and a single interconnection network 120. FIG. 1C illustrates an exemplary packet switch 140 having multiple interconnection networks 141 and folded input and output interfaces 149. FIG. 1D illustrates an exemplary folded packet switch 160 having multiple interconnection networks 161 and folded input and output interfaces 169. Embodiments of each of these packet switches 115, 140 and 160 and line cards to which they are connected may include embodiments of a token bucket system as disclosed herein. Of course, the invention is not limited to these illustrated operating environments and embodiments, and the packet switching systems may have more or less elements.

FIG. 1B illustrates an exemplary embodiment of a packet switch 115. Packet switch 115 comprises multiple input interfaces 117, interconnection network 120, and output interfaces 129. Input interfaces 117 and output interfaces 129 are both coupled over multiple links to interconnection network 120. Line cards 116 and 131 are coupled to input interfaces 117 and output interfaces 131. In some embodiments including other packet switching topologies, line cards or their functionality may be included in the packet switch itself, or as part of the packet switching system.

In one embodiment, interconnection network 120 comprises multiple switch elements SE-1 122, SE-2 125, and SE-3 128 that are interconnected by multiple links. Line cards 116 and 131 may connect to other systems (not shown) to provide data items (e.g., packets) to be routed by packet switch 115. Embodiments may use a token bucket scheme according to the invention in one or more components, including line cards 116, 131, input interfaces 117, switch elements SE-1 122, SE-2 125, and SE-3 128, output interfaces 129, and/or other locations within packet switch 115 or the packet switching system.

FIG. 1C illustrates another exemplary operating environment and embodiment of a packet switch 140. Packet switch 140 comprises multiple folded input and output interfaces 149 interconnected over multiple links to interconnection networks 141, which are interconnected over multiple links returning to input and output interfaces 149. In one embodiment, interconnection networks 141 comprise multiple switch elements SE-1 142, SE-2 145, and SE-3 148 also interconnected by multiple links. Interfaces 149 may connect via bi-directional links to line cards 139 that connect with other systems (not shown) to provide data items (e.g., packets) to be routed by packet switch 140. Embodiments may use a token bucket scheme according to the invention in one or more components, including line cards 139, input and output interfaces 149, switch elements SE-1 142, SE-2 145, and SE-3 148, and/or other locations within packet switch 140 or the packet switching system.

FIG. 1D illustrates another exemplary operating environment and embodiment of a packet switch 160. Packet switch 160 has a folded network topology. Packet switch 160 comprises multiple folded input and output interfaces 169 interconnected over multiple links to interconnection networks 161, which are interconnected over multiple links returning to interfaces 169. In one embodiment, interconnection networks 161 comprise multiple switch elements SE-1 & SE-3 162 and SE-2 164 also interconnected by multiple links. Interfaces 169 may connect via bi-directional links to line cards 159 which connect via ports 158 to other systems (not shown) to provide data items to be routed by packet switch 160. Embodiments may use a token bucket scheme according to the invention in one or more components, including line cards 159, input and output interfaces 169, switch elements SE-1 & SE-3 162 and SE-2 164, and/or other locations within packet switch 160 or the packet switching system.

Figure 2A:
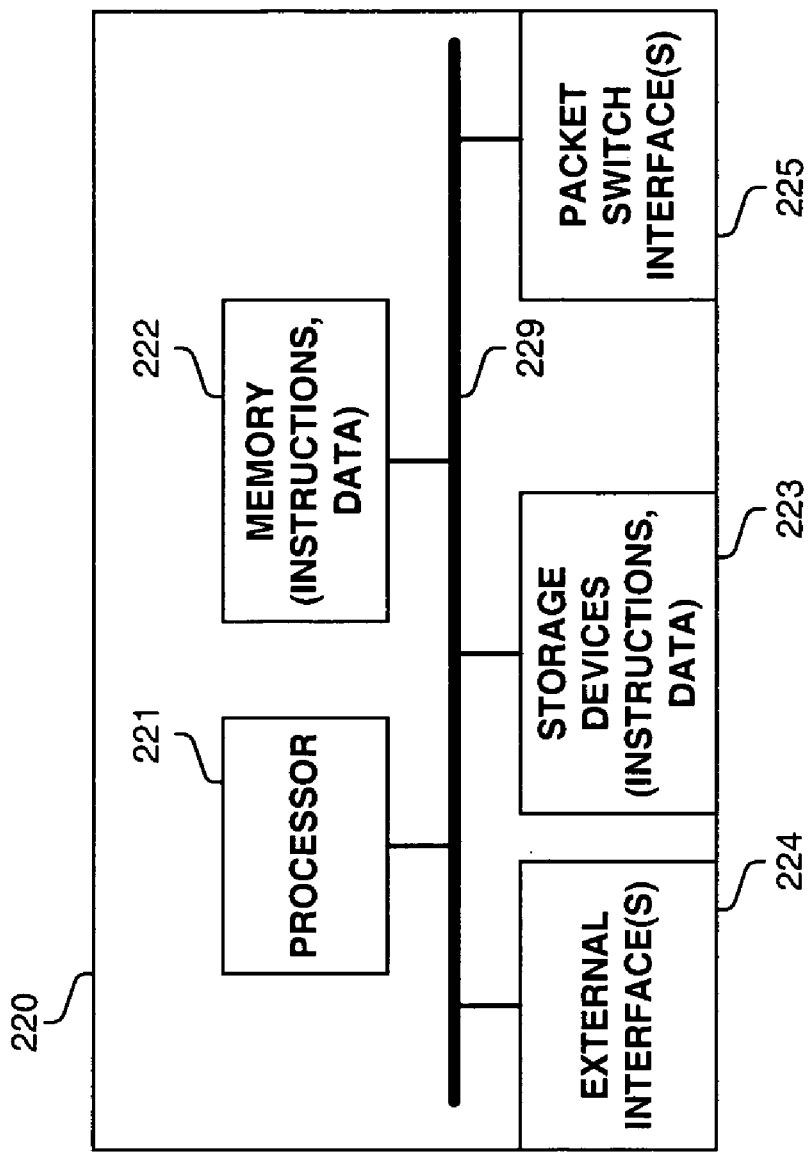
FIGS. 2A–C are block diagrams illustrating exemplary embodiments including a packet switching system component, such as, for example, a line card and/or input/output interface in which the invention may be practiced.
Figure 2B:
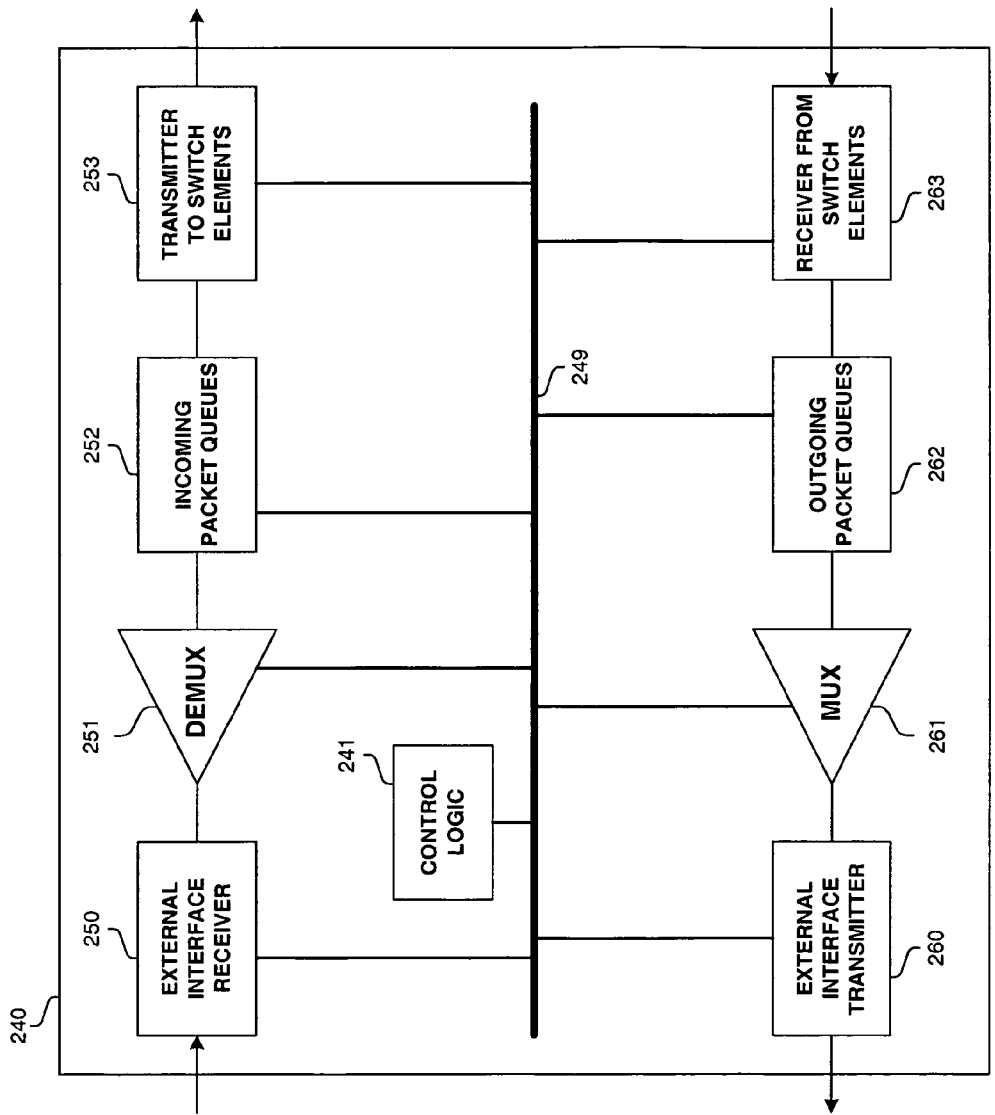
Figure 2C:
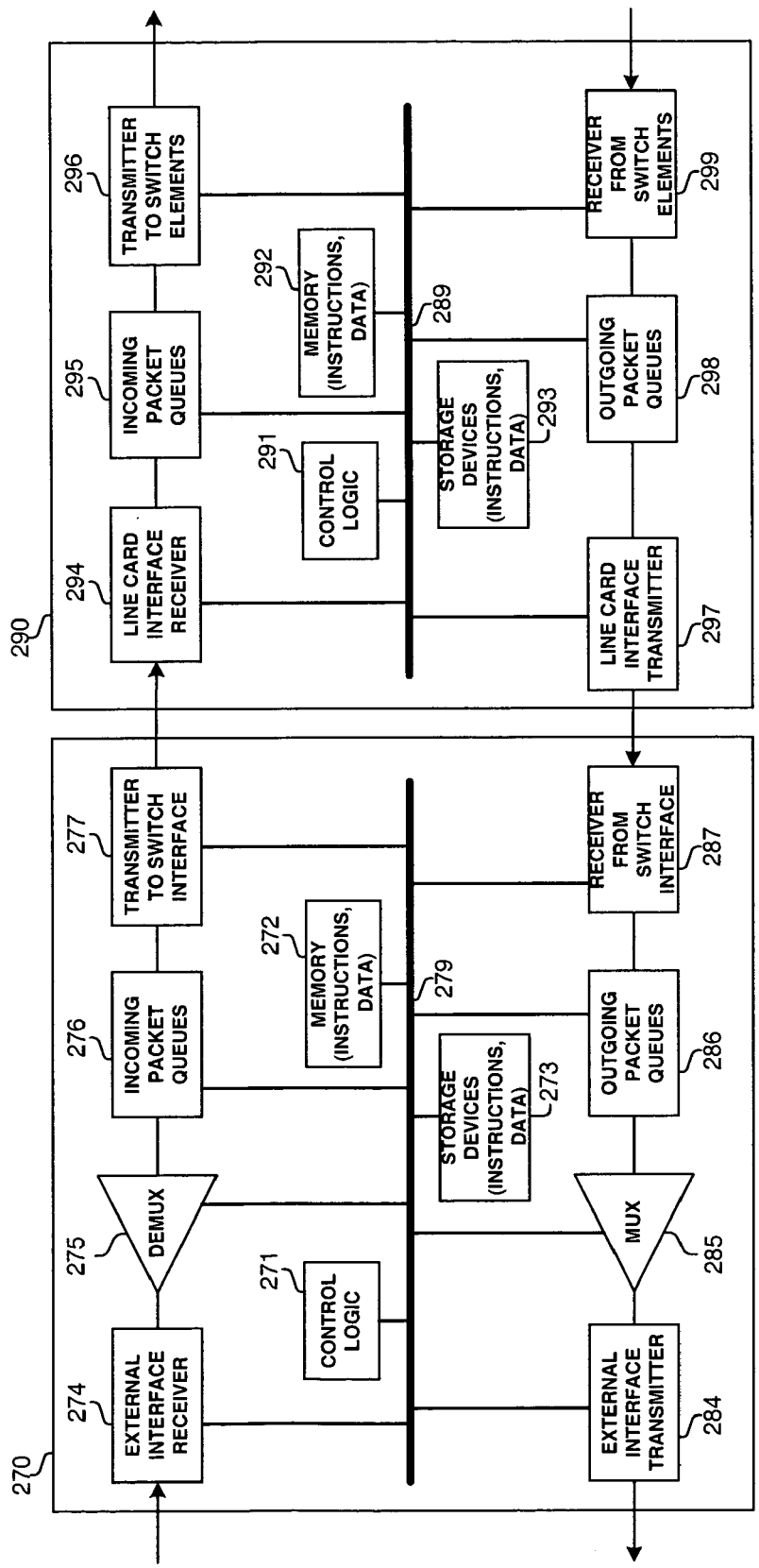

FIGS. 2A–C illustrate three of numerous possible embodiments of a line card, input interface, output interface, and/or input/output interface using a token bucket metering or policing system with a delayed filing scheme. For illustrative purposes, only single transmitters and receivers may be shown. It should be clear to one skilled in the art that multiple transmitters and receivers may be used to communicate with multiple sources and destinations (e.g., line cards, switch fabrics, etc.)

FIG. 2A illustrates one embodiment 220 comprising a processor 221, memory 222, storage devices 223, and one or more external interface(s) 224, and one or more packet switch interface(s) 225, and one or more internal communications mechanisms 229 (shown as a bus for illustrative purposes). External interface(s) 224 receive and send external signals to one or more communications devices or networks (e.g., one or more networks, including, but not limited to the Internet, intranets, private or public telephone, cellular, wireless, satellite, cable, local area, metropolitan area and/or wide area networks). Memory 222 is one type of computer-readable medium, and typically comprises random access memory (RAM), read only memory (ROM), integrated circuits, and/or other memory components. Memory 222 typically stores computer-executable instructions to be executed by processor 221 and/or data which is manipulated by processor 221 for implementing token bucket metering or policing in accordance with certain embodiments of the invention. Storage devices 223 are another type of computer-readable medium, and typically comprise disk drives, diskettes, networked services, tape drives, and other storage devices. Storage devices 223 typically store computer-executable instructions to be executed by processor 221 and/or data which is manipulated by processor 221 for implementing token bucket metering or policing in accordance with certain embodiments of the invention.

FIG. 2B illustrates embodiment 240 having a single element providing the functionality of a line card and an input/output interface, for example that of line card 159 and input/output interface 169 (FIG. 1C). FIGS. 2B–C will be described in relation to FIG. 1C for illustrative purposes; however, these embodiments could be used with other packet switch topologies and other implementations and embodiments. Embodiment 240 comprises control logic 241 implementing token bucket metering or policing in accordance with certain embodiments of the invention. In one embodiment control logic 241 includes memory for storage of data and instructions. Control logic 241 is connected to other components of embodiment 240 via one or more internal communications mechanisms 249 (shown as a bus for illustrative purposes). External interface receiver 250 receives external signals, separates the signals into channels using demultiplexor 251 into multiple streams of packets which are temporarily stored in incoming packet buffer 252. In one embodiment, at the appropriate time and in accordance with the token bucket scheme disclosed herein, a packet is sent to the appropriate switch element SE-1 & SE-3 162 via transmitter to switch elements 253. Packets are received from switch elements SE-1 & SE-3 162 at the receiver from switch elements 263 and placed in the outgoing packet buffer 262. Multiplexor 261 extracts the packets and creates a multiplexed signal which is transmitted via external interface transmitter 260.

FIG. 2C illustrates an embodiment of a line card 270 and a switch interface 290, which could correspond to line card 159 and input/output interfaces 169 illustrated in FIG. 2C. The embodiment of line card 270 illustrated in FIG. 2C includes control logic 271 implementing token bucket metering or policing in accordance with certain embodiments of the invention. Control logic 271 is connected to other components of line card 270 via one or more internal communications mechanisms 279 (shown as a bus for illustrative purposes). In one embodiment, control logic 271 includes memory for storing instructions and data. Line card 270 also includes optional additional memory 272 and storage devices 273. External interface receiver 274 receives external signals 201 (FIG. 2), separates the signals into channels using demultiplexor 275 into multiple streams of packets which are temporarily stored in incoming packet buffer 276. At the appropriate time, a packet is sent to switch interface 290 via transmitter to switch interface 277. Packets are received from switch interface 290 at the receiver from switch interface 287 and placed in the outgoing packet buffer 286. Multiplexor 285 extracts the packets and creates a multiplexed signal which is transmitted via external interface transmitter 284. In one embodiment, control logic 271, referencing a data structure within control logic 271 or memory 272, to implement a token bucket metering or policing scheme.

The embodiment of input/output interface 290 illustrated in FIG. 2C includes control logic 291 implementing token bucket metering or policing in accordance with certain embodiments of the invention. Control logic 291 is connected to other components of switch interface 290 via one or more internal communications mechanisms 289 (shown as a bus for illustrative purposes). In one embodiment, control logic 291 includes memory for storing instructions and data. Switch interface 290 also includes optional additional memory 292 and storage devices 293. Line card receiver 294 receives packets from line card 270 temporarily stores the packets in incoming packet buffer 295. At the appropriate time, a packet is sent to an appropriate switch element SE-1 & SE-3 162 via transmitter to switch elements 296. Packets are received from switch elements SE-1 & SE-3 162 at the receiver from switch elements 299 and placed in the outgoing packet buffer 298. Line card interface transmitter 297 then forwards these to line card 270. In one embodiment, control logic 291, referencing a data structure within control logic 291 or memory 292, to implement a token bucket metering or policing scheme.

Figure 3A:
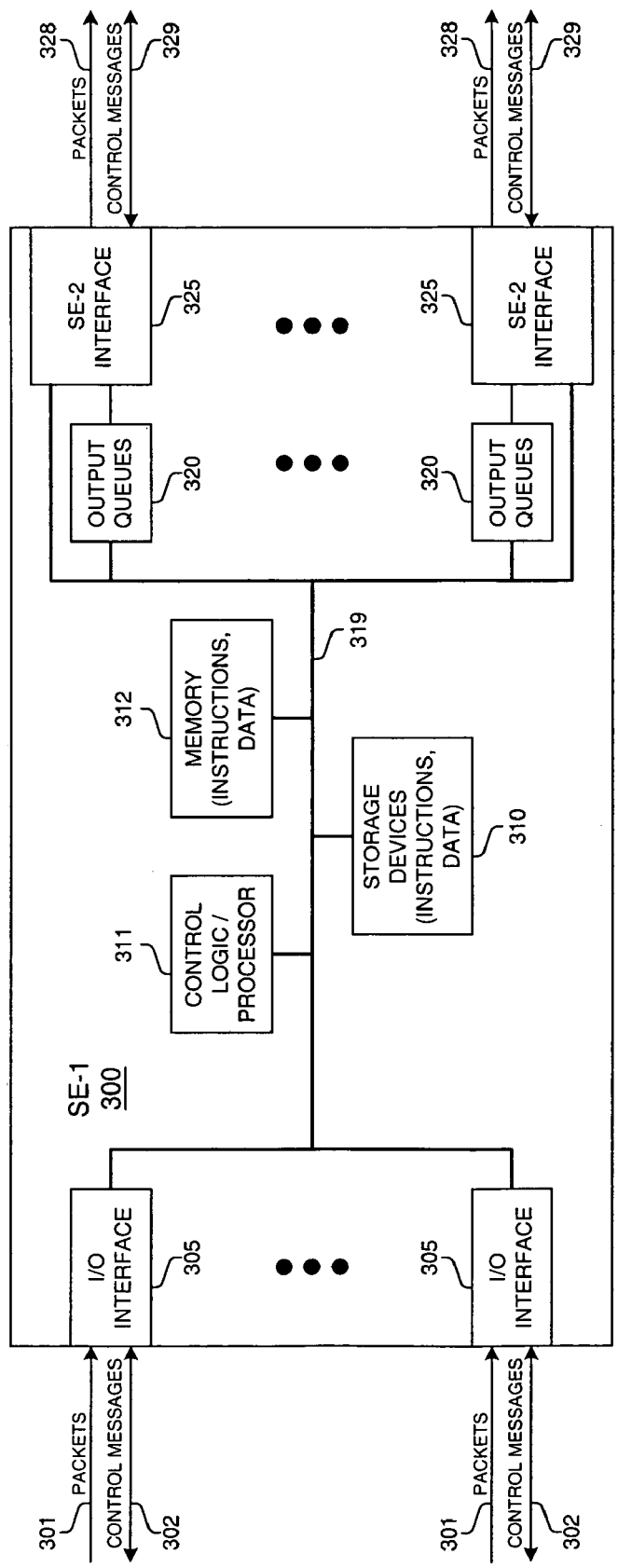
FIGS. 3A–C are block diagrams of exemplary embodiments including switching fabric components.
Figure 3B:
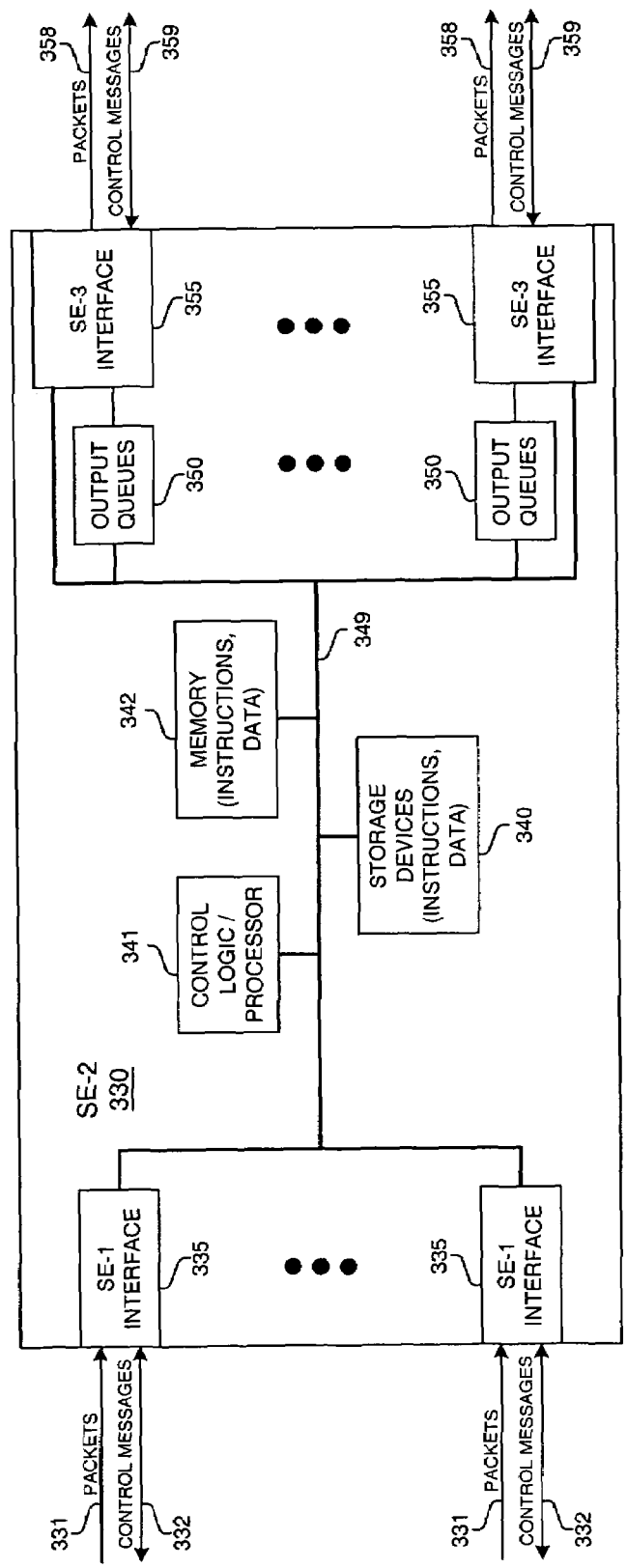
Figure 3C:
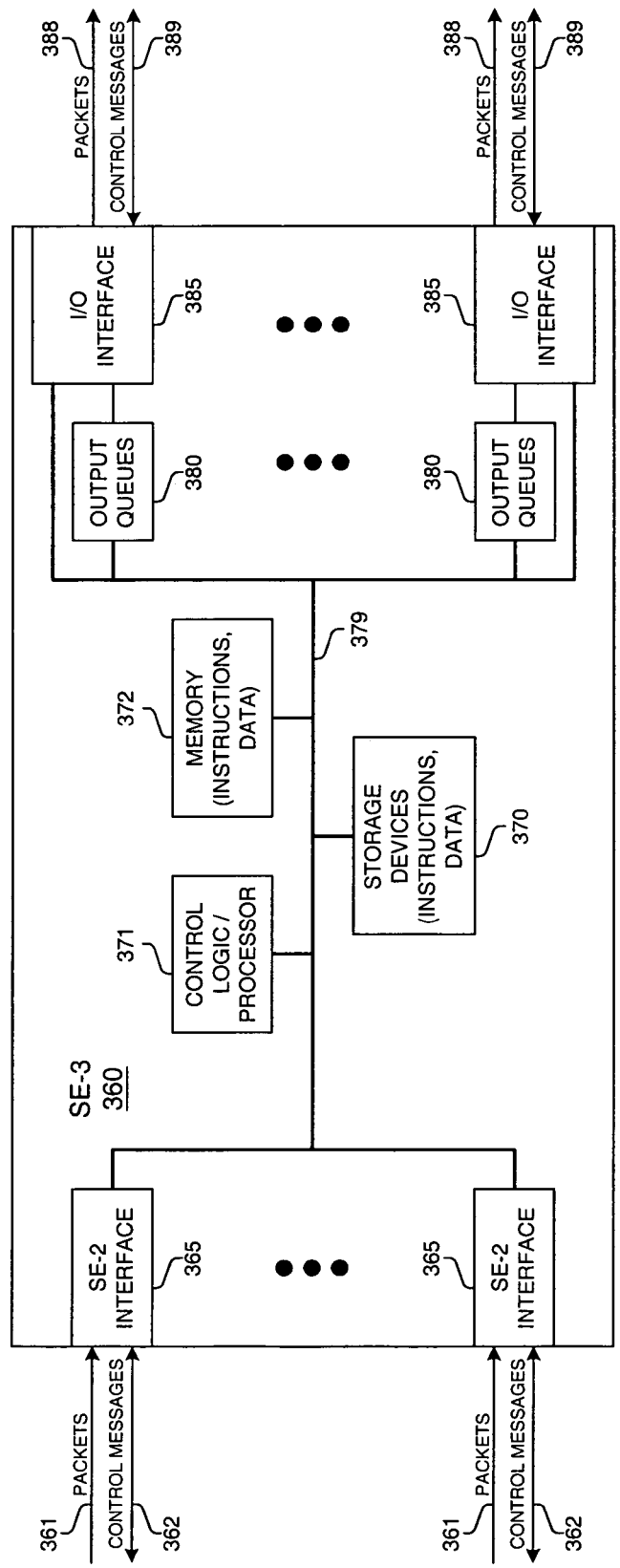

FIGS. 3A–C illustrate exemplary embodiments of switching elements and/or their components using a token bucket metering or policing system with a delayed filing scheme. FIG. 3A is a block diagram of a first stage switching element, SE-1 300. FIG. 3B is a block diagram of a second stage switching element SE-2 330. FIG. 3C is a block diagram of a third stage switching element SE-3 360. Various embodiments may use a token bucket scheme at an input interface, a queue, an output interface, or internally within a switching element. As would be understood by one skilled in the art, the invention is not limited to these or any other embodiment described herein. Rather, the invention as described herein is extensible to an unlimited number of embodiments and implementations.

FIG. 3A illustrates an embodiment of SE-1 300 comprising control logic and/or processor 311 (hereinafter "control logic"), memory 312, storage devices 310, I/O interfaces 305, output queues 320, SE-2 interfaces 325, and one or more internal communications mechanisms 319 (shown as a bus for illustrative purposes). In certain embodiments, control logic 311 comprises custom control circuitry for controlling the operation of SE-1 300 and no storage device 310 is used. Memory 312 is one type of computer-readable medium, and typically comprises random access memory (RAM), read only memory (ROM), integrated circuits, and/or other memory components. Memory 312 typically stores computer-executable instructions to be executed by control logic 311 and/or data which is manipulated by control logic 311 for implementing token bucket metering or policing in accordance with certain embodiments of the invention. Storage devices 310 are another type of computer-readable medium, and typically comprise disk drives, diskettes, networked services, tape drives, and other storage devices. Storage devices 310 typically store computer-executable instructions to be executed by control logic 311 and/or data which is manipulated by control logic 311 for implementing token bucket metering or policing in accordance with certain embodiments of the invention.

Each SE-1 300 receives packets 301 and exchanges control messages 302 over one or more links with one or more input interfaces (not shown) such as input/output interface 290 (FIG. 2C) via I/O interfaces 305. In other embodiments, data packets and control messages are transmitted over a common link or links, and/or communication interfaces have a folded topology. Additionally, each SE-1 300 sends packets 328 and exchanges control messages 329 over one or more links with one or more SE-2 elements (not shown) such as SE-2 330 (FIG. 3B) via SE-2 interfaces 325. Control logic 311 may be used to implement a token bucket metering or policing scheme. Outgoing packets and control messages are placed in output queues 320. In one embodiment, there is an output queue 320 for each destination, or for each class of service for each destination. In one embodiment, each output queue 320 implements a token bucket scheme according to the invention. In one embodiment, each input and/or output interface 305, 325 implements a token bucket scheme according to the invention.

FIG. 3B illustrates an embodiment of SE-2 330 comprising control logic and/or processor 341 (hereinafter "control logic"), memory 342, storage devices 340, SE-1 interfaces 335, output queues 350, SE-3 interfaces 355, and one or more internal communications mechanisms 349 (shown as a bus for illustrative purposes). In certain embodiments, control logic 341 comprises custom control circuitry for controlling the operation of SE-2 330 and no storage device 340 is used. Memory 342 is one type of computer-readable medium, and typically comprises random access memory (RAM), read only memory (ROM), integrated circuits, and/or other memory components. Memory 342 typically stores computer-executable instructions to be executed by control logic 341 and/or data which is manipulated by control logic 341 for implementing token bucket metering or policing in accordance with certain embodiments of the invention. Storage devices 340 are another type of computer-readable medium, and typically comprise disk drives, diskettes, networked services, tape drives, and other storage devices. Storage devices 340 typically store computer-executable instructions to be executed by control logic 341 and/or data which is manipulated by control logic 341 for implementing functionality in accordance with certain embodiments of the invention.

Each SE-2 330 receives packets 331 and exchanges control messages 332 over one or more links with one or more SE-1 elements (not shown) such as SE-1 300 (FIG. 3A) via SE-1 interfaces 335. In other embodiments, data packets and control messages are transmitted over a common link or links, and/or communication interfaces have a folded topology. For example, the communications functions of SE-1 interface 335 and SE-3 interface 355 could be combined, which is particularly useful in an embodiment where SE-1 300 (FIG. 3A) and SE-3 360 (FIG. 3C) are implemented on a single component. (e.g., chip or circuit board). Additionally, each SE-2 330 sends packets 358 and exchanges control messages 359 over one or more links with one or more SE-3 elements (not shown) such as SE-3 360 (FIG. 3C) via SE-3 interfaces 355. In one embodiment using a folded topology, the links between (a) SE-2 330 and SE-1

300 and (b) SE-2 330 and SE-3 360 are the same links. Control logic 341 may implement a token bucket metering or policing scheme. Outgoing packets and control messages are placed in output queues 350. In one embodiment, there is an output queue 350 for each destination, or for each class of service for each destination. In one embodiment, each output queue 350 implements a token bucket scheme according to the invention. In one embodiment, each input and/or output interface 335, 355 implements a token bucket scheme according to the invention.

FIG. 3C illustrates an embodiment of SE-3 360 comprising control logic and/or processor 371 (hereinafter "control logic"), memory 372, storage devices 370, SE-2 interfaces 365, output queues 380, I/O interfaces 385, and one or more internal communications mechanisms 379 (shown as a bus for illustrative purposes). In certain embodiments, control logic 371 comprises custom control circuitry for controlling the operation of SE-3 360 and no storage device 370 is used. Memory 372 is one type of computer-readable medium, and typically comprises random access memory (RAM), read only memory (ROM), integrated circuits, and/or other memory components. Memory 372 typically stores computer-executable instructions to be executed by control logic 371 and/or data which is manipulated by control logic 371 for implementing functionality in accordance with certain embodiments of the invention. Storage devices 370 are another type of computer-readable medium, and typically comprise disk drives, diskettes, networked services, tape drives, and other storage devices. Storage devices 370 typically store computer-executable instructions to be executed by control logic 371 and/or data which is manipulated by control logic 371 for implementing token bucket metering or policing in accordance with certain embodiments of the invention.

Each SE-3 360 receives packets 361 and exchanges control messages 362 over one or more links with one or more SE-2 elements (not shown) such as SE-2 330 (FIG. 3B) via SE-2 interfaces 365. In other embodiments, data packets and control messages are transmitted over a common link or links, and/or communication interfaces have a folded topology. Additionally, SE-3 360 sends packets 388 and exchanges control messages 389 over one or more links with one or more output interface elements (not shown) such as Input/Output interface 390 (FIG. 2C) via I/O interfaces 385. Control logic 371 receives control packets containing flow control information, and updates its flow control data structure stored in memory 372. In one embodiment, there is an output queue 380 for each destination, or for each class of service for each destination. In one embodiment, each output queue 380 implements a token bucket scheme according to the invention. In one embodiment, each input and/or output interface 365, 385 implements a token bucket scheme according to the invention.

FIG. 4 illustrates one data structure 400 used by one embodiment. For simplicity, data structure 400 is in the form of an array where the index number corresponds to an identifiable stream s 401 of packets. The stream to which a packet belongs may be determined based on a source and/or destination and/or quality of service or other criteria which may be included in a packet itself, identified in some data structure, or by other means as would be apparent to one skilled in the art.

For each stream 401, a token field 402 is used for storing a current number of tokens in the token bucket, a last time field 403 for storing a last time for which tokens were added in token field 402, a bucket size field 404, a token generation rate field 405, a fill time field 406 corresponding to the time to generate enough tokens to fill an empty bucket, a maximum sized packet time field 407 corresponding to the time required to generate enough tokens for a maximum sized packet, and a maximum sized packet token field 408 corresponding to the number of tokens required for a maximum sized packet. In one embodiment, fields 402–403 will vary during operation, while fields 404–408 remain constant after an initial configuration. Based on the values initial configured in rate field 405 and bucket size field 404, the values of fields 406–408 can be determined. Should a rate or bucket size change, then the other parameters can be recalculated and used thereafter. Other embodiments may use a data structure with more or less fields. For example, if some or all streams have common parameters, such as the same token generating rates and bucket rates, then data structure 400 may only include a token field 402 and a last time field 403.

Figure 5:
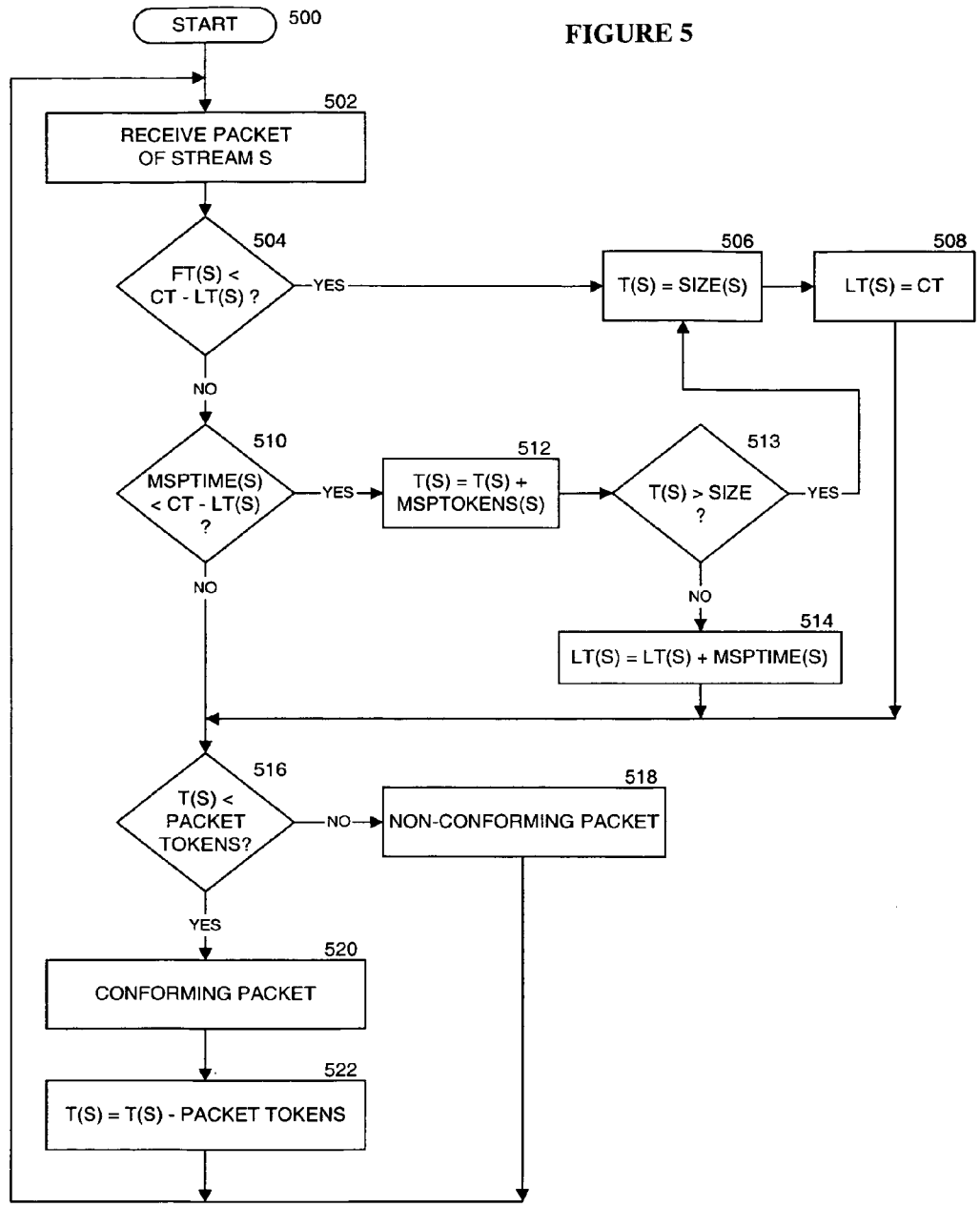
FIG. 5 is a flow diagram illustrating one embodiment of a process of a token bucket metering or policing system using a delayed bucket filling scheme in response to receiving a packet.

FIG. 5 illustrates one embodiment of a process for a token bucket metering or policing using a delayed update scheme. Processing begins at process block 500, and proceeds to process block 502 where a packet from a stream s is received. Next, as determined in process block 504, if the time interval between the current time and the time that the packet was received by the process of FIG. 5 (such as received in a component or device, removed from a queue, etc.) is greater than or equal to the time required to generate enough tokens to completely fill the token bucket for the stream s, then the token bucket for stream s is filled in process block 506, and the last update time for stream s is set to the current time in process block 508.

Otherwise, as determined in process block 510, if the time interval between the current time and the time that the packet was received is greater than or equal to the time required to generate the requisite number of tokens to send a maximum sized packet, then the requisite number of tokens to send a maximum sized packet is added to the token bucket for stream s in process block 512. By updating the last bucket update time value by approximately a predetermined time interval (e.g., the time required to generate the requisite number of tokens to send a maximum sized packet, some other value, etc.) rather than merely setting it to the current time, tokens which should be added to the token bucket are not lost, but rather added at a later time. If this addition of tokens exceeds the size of the bucket as determined in process block 513, then processing returns to process block 506. Otherwise, in process block 514, the current time is updated by adding the time interval required based on the token generation rate for stream s to generate the requisite number of tokens to send a maximum sized packet.

Next, as determined in process block 516, if the token bucket for stream s has enough tokens for the packet received in process block 502, then the conforming packet is handled (e.g., sent, etc.) in process block 520, and the token bucket is decreased by the number of tokens for the packet in process block 522. Otherwise, the packet is handled as non-conforming (e.g., dropped, marked as non-conforming, etc.) in process block 518. Processing returns to process block 502 to receive and process more packets.

Figure 6A:
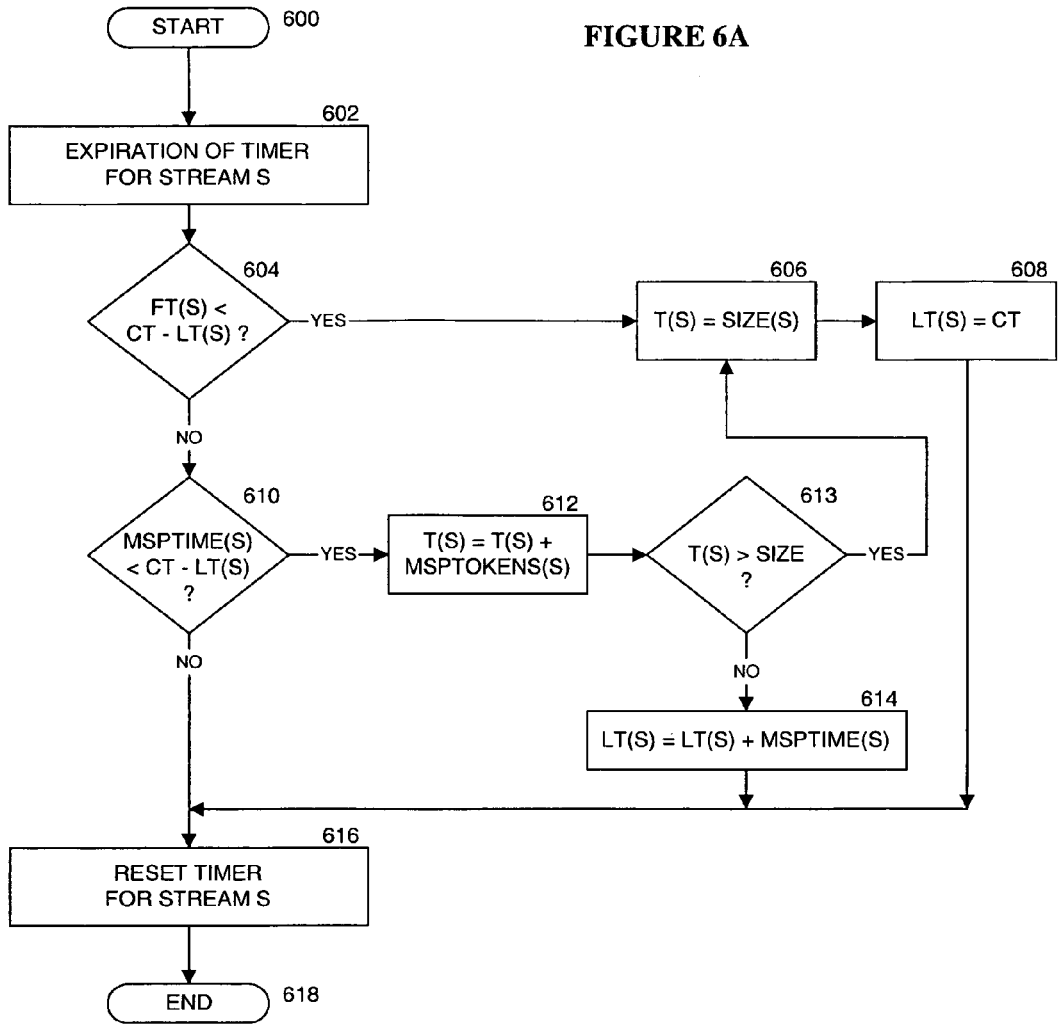
FIGS. 6A–B are flow diagrams illustrating one embodiment of processes of a token bucket metering or policing system using a delayed bucket filling scheme in response to a expiration of a timer.
Figure 6B:
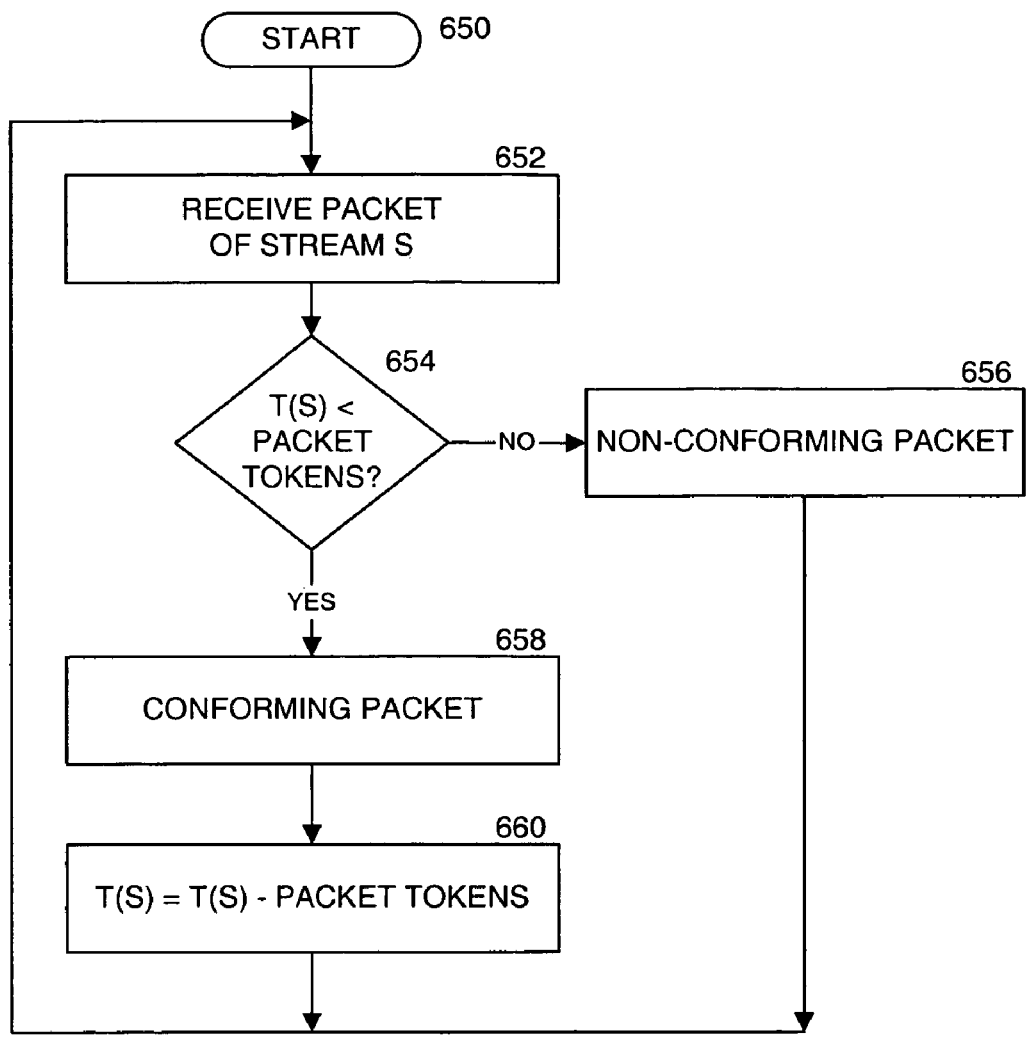

FIGS. 6A–B illustrate processes for a token bucket metering or policing using a delayed update scheme in response to an expiration of a timer. Processing of the flow diagram of FIG. 6A begins at process block 600, and proceeds to process block 602 where a timer for stream s expires. Next, as determined in process block 604, if the time interval between the current time and the time that a packet of the stream was received by the process of FIG. 6B (such as received in a component or device, removed from a queue, etc.) is greater than or equal to the time required to generate enough tokens to completely fill the token bucket for the stream s, then fill the token bucket for stream s in process block 606, and set the last update time for stream s to the current time in process block 608.

Otherwise, as determined in process block 610, if the time interval between the current time and the time that the packet was received by the process of FIG. 6B is greater than or equal to the time required to generate the requisite number of tokens to send a maximum sized packet, then the requisite number of tokens to send a maximum sized packet is added to the token bucket for stream s in process block 612. If this addition of tokens exceeds the size of the bucket as determined in process block 613, then processing returns to process block 606. Otherwise, the current time is updated in process block 614 by adding the time interval required based on the token generation rate for stream s to generate the requisite number of tokens to send a maximum sized packet. Then, the timer for stream s is reset in process block 616. In one embodiment, the timer is sent to the time required to generate enough tokens for a maximum sized packet, or some other sized packet (e.g., minimum sized, etc.). Processing of the flow diagram of FIG. 6A is completed as indicated by process block 618.

FIG. 6B illustrates one embodiment for receiving and handling packets according to the token bucket scheme according to the invention, which can, for example, be used in conjunction with the process illustrated in FIG. 6A. Processing begins at process block 650 and proceeds to process block 652, where a packet is received by the process of FIG. 6B (such as received in a component or device, removed from a queue, etc.). Next, as determined in process block 654, if the token bucket for stream s has enough tokens for the packet received in process block 652, then the conforming packet is handled (e.g., sent, etc.) in process block 658, and the token bucket is decreased by the number of tokens for the packet in process block 660. Otherwise, the packet is handled as non-conforming (e.g., dropped, marked as non-conforming, etc.) in process block 656. Processing returns to process block 652 to receive and process more packets.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method comprising:
   determining whether a difference between a current time value with a last bucket update time value equals or exceeds a predetermined time interval;
   adding a predetermined number of tokens to a bucket if the difference between the current time value with the last bucket update time value equals or exceeds the predetermined time interval; and
   incrementing the current time value by approximately the predetermined time interval if the difference between the current time value with the last bucket update time value equals or exceeds the predetermined time interval.

2. The method of claim 1, wherein the predetermined time interval approximates the time required to generate a number of tokens required for a maximum sized packet to be conforming.

3. The method of claim 2, wherein the predetermined number of tokens is the number of tokens required for a maximum sized packet to be conforming.

4. The method of claim 1, further comprising maintaining a data structure, the data structure including a bucket field for storing a value of a number of tokens in the bucket.

5. The method of claim 4, wherein the data structure further includes a last time field for storing the last bucket update time value.

6. The method of claim 1, further including receiving a packet; wherein the current time value approximates a time of receiving the packet or removing the packet from a second data structure or queue.

7. The method of claim 1, wherein said determining whether the difference between the current time value with the last bucket update time value equals or exceeds the predetermined time interval is performed in response to receiving a packet.

8. The method of claim 1, wherein said determining whether the difference between the current time value with the last bucket update time value equals or exceeds the predetermined time interval is performed in response to an expiration of a timer.

9. A method comprising:
   maintaining a data structure including a token value, a last time value, and a threshold value for a plurality of metering or policing rates;
   in response to receiving a packet, retrieving from the data structure a particular token value and a particular last time value corresponding to the received packet;
   retrieving from the data structure a particular threshold value for the metering or policing rate corresponding to the received packet; and
   when a time interval from the particular last time value equals or exceeds the particular threshold value, incrementing the particular token value by a predetermined value and incrementing the particular last time value by the particular threshold value, and updating the data structure with the incremented particular token value and the incremented particular last time value.

10. The method of claim 9, wherein the predetermined value corresponds to a number of tokens required for a conforming maximum sized packet at a particular metering or policing rate corresponding to the received packet.

11. The method of claim 9, further comprising setting the incremented particular token value to a bucket size value if the incremented particular token value or a summation of the particular token value and the predetermined value exceeds the bucket size value.

12. The method of claim 9, wherein the particular threshold value roughly corresponds to a packet time interval for a maximum sized packet at a particular metering or policing rate corresponding to the received packet.

13. The method of claim 9, wherein the received packet belongs to one of a plurality of streams of packets, and the data structure includes a stream token value and a stream last time value for each of the plurality of streams of packets.

14. The method of claim 13, further comprising identifying said one of the plurality of streams of packets.

15. One or more computer-readable media containing computer-executable instructions for performing steps, said steps comprising:

determining whether a difference between a current time value with a last bucket update time value equals or exceeds a predetermined time interval;

adding a predetermined number of tokens to a bucket if the difference between the current time value with the last bucket update time value equals or exceeds the predetermined time interval; and incrementing the current time value by approximately the predetermined time interval if the difference between the current time value with the last bucket update time value equals or exceeds the predetermined time interval.

16. The computer-readable media of claim 15, wherein the predetermined time interval approximates the time required to generate a number of tokens required for a maximum sized packet to be conforming.

17. The computer-readable media of claim 16, wherein the predetermined number of tokens is the number of tokens required for a maximum sized packet to be conforming.

18. The computer-readable media of claim 15, further comprising maintaining a data structure, the data structure including a bucket field for storing a value of a number of tokens in the bucket.

19. The computer-readable media of claim 18, wherein the data structure further includes a last time field for storing the last bucket update time value.

20. The computer-readable media of claim 15, further including receiving a packet; wherein the current time value approximates a time of receiving the packet or removing the packet from a second data structure or queue.

21. The computer-readable media of claim 15, wherein said determining whether the difference between the current time value with the last bucket update time value equals or exceeds the predetermined time interval is performed in response to receiving a packet.

22. The computer-readable media of claim 15, wherein said determining whether the difference between the current time value with the last bucket update time value equals or exceeds the predetermined time interval is performed in response to an expiration of a timer.

23. An apparatus comprising:

means for determining whether a difference between a current time value with a last bucket update time value equals or exceeds a predetermined time interval;

means for adding a predetermined number of tokens to a bucket if the difference between the current time value with the last bucket update time value equals or exceeds the predetermined time interval; and means for incrementing the current time value by approximately the predetermined time interval if the difference between the current time value with the last bucket update time value equals or exceeds the predetermined time interval.

24. The apparatus of claim 23, wherein the predetermined time interval approximates the time required to generate a number of tokens required for a maximum sized packet to be conforming.

25. The apparatus of claim 24, wherein the predetermined number of tokens is the number of tokens required for a maximum sized packet to be conforming.

26. The apparatus of claim 23, further comprising means for maintaining a data structure, the data structure including a bucket field for storing a value of a number of tokens in the bucket.

27. The apparatus of claim 26, wherein the data structure further includes a last time field for storing the last bucket update time value.

28. The apparatus of claim 23, further including means for receiving a packet; wherein the current time value approximates a time of receiving the packet or removing the packet from a second data structure or queue.

29. The apparatus of claim 23, wherein said means for determining whether the difference between the current time value with the last bucket update time value equals or exceeds the predetermined time interval is responsive to receiving a packet.

30. The apparatus of claim 23, wherein said determining whether the difference between the current time value with the last bucket update time value equals or exceeds the predetermined time interval is responsive to an expiration of a timer.

31. One or more computer-readable media containing computer-executable instructions for performing steps, said steps comprising:

maintaining a data structure including a token value, a last time value, and a threshold value for a plurality of metering or policing rates;

in response to receiving a packet, retrieving from the data structure a particular token value and a particular last time value corresponding to the received packet;

retrieving from the data structure a particular threshold value for the metering or policing rate corresponding to the received packet; and when a time interval from the particular last time value equals or exceeds the particular threshold value, incrementing the particular token value by a predetermined value and incrementing the particular last time value by the particular threshold value, and updating the data structure with the incremented particular token value and the incremented particular last time value.

32. The computer-readable media of claim 31, wherein the predetermined value corresponds to a number of tokens required for a conforming maximum sized packet at a particular metering or policing rate corresponding to the received packet.

33. The computer-readable media of claim 31, further comprising setting the incremented particular token value to a bucket size value if the incremented particular token value or a summation of the particular token value and the predetermined value exceeds the bucket size value.

34. The computer-readable media of claim 31, wherein the particular threshold value roughly corresponds to a packet time interval for a maximum sized packet at a particular metering or policing rate corresponding to the received packet.

35. The computer-readable media of claim 31, wherein the received packet belongs to one of a plurality of streams of packets, and the data structure includes a stream token value and a stream last time value for each of the plurality of streams of packets.

36. The computer-readable media of claim 35, further comprising identifying said one of the plurality of streams of packets.

37. An apparatus comprising:

means for maintaining a data structure including a token value, a last time value, and a threshold value for a plurality of metering or policing rates;

means for retrieving from the data structure, in response to receiving a packet, a particular token value and a particular last time value corresponding to the received packet;

means for retrieving from the data structure a particular threshold value for the metering or policing rate corresponding to the received packet; and means for incrementing the particular token value by a predetermined value and incrementing the particular last time value by the particular threshold value and updating the data structure with the incremented particular token value and the incremented particular last time value in response to a time interval from the particular last time value equaling or exceeding the particular threshold value.

38. The apparatus of claim 37, wherein the predetermined value corresponds to a number of tokens required for a conforming maximum sized packet at a particular metering or policing rate corresponding to the received packet.

39. The apparatus of claim 37, further comprising means for setting the incremented particular token value to a bucket size value if the incremented particular token value or a summation of the particular token value and the predetermined value exceeds the bucket size value.

40. The apparatus of claim 37, wherein the particular threshold value roughly corresponds to a packet time interval for a maximum sized packet at a particular metering or policing rate corresponding to the received packet.

41. The apparatus of claim 37, wherein the received packet belongs to one of a plurality of streams of packets, and the data structure includes a stream token value and a stream last time value for each of the plurality of streams of packets.

42. The apparatus of claim 41, further comprising means for identifying said one of the plurality of streams of packets.

* * * * *